US 8,279,056 B2

(12) United States Patent
Fujita et al.

(10) Patent No.: US 8,279,056 B2
(45) Date of Patent: Oct. 2, 2012

(54) APPARATUS, METHOD AND COMPUTER FOR DETECTING DECREASE IN TIRE AIR PRESSURE BY CALCULATING A GAIN CORRESPONDING TO AN ARBITRARY FREQUENCY

(75) Inventors: Hajime Fujita, Nishinomiya (JP); Hiroaki Kawasaki, Ashiya (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 624 days.

(21) Appl. No.: 12/496,791

(22) Filed: Jul. 2, 2009

(65) Prior Publication Data

US 2010/0013616 A1 Jan. 21, 2010

(30) Foreign Application Priority Data

Jul. 18, 2008 (JP) .................................. 2008-187553

(51) Int. Cl.
*G08B 21/00* (2006.01)
(52) U.S. Cl. .................. 340/444; 340/442; 73/146.2
(58) Field of Classification Search .......... 340/442–444; 73/146.2–146.5
See application file for complete search history.

(56) References Cited

U.S. PATENT DOCUMENTS

| 2002/0178823 A1* | 12/2002 | Inoue .............................. 73/702 |
| 2007/0139179 A1* | 6/2007 | Yanase ........................ 340/443 |

FOREIGN PATENT DOCUMENTS

| EP | 0578826 A1 | 1/1994 |
| EP | 1260389 A1 | 11/2002 |
| EP | 1798077 A2 | 6/2007 |
| JP | 6-183230 A | 7/1994 |
| JP | 6-297923 A | 10/1994 |
| JP | 3152151 B2 | 1/2001 |

OTHER PUBLICATIONS

Extended European Search Report dated Jun. 18, 2010 for European Application No. 09008632.3.

* cited by examiner

*Primary Examiner* — Jeffery Hofsass
(74) *Attorney, Agent, or Firm* — Birch, Stewart, Kolasch & Birch, LLP

(57) ABSTRACT

The invention includes: a rotation velocity information detection means for regularly detecting tire rotation velocity information regarding the respective wheels of a vehicle; a frequency characteristic estimation means for estimating a frequency characteristic of the rotation velocity information based on the rotation velocity information obtained from the rotation velocity information detection means; and a determination means for determining a decrease in the air pressure of the tire based on the estimated frequency characteristic. The frequency characteristic estimation means is configured to extract a resonance peak of the rotation velocity information by calculating a gain corresponding to an arbitrary frequency.

8 Claims, 5 Drawing Sheets

APPARATUS, METHOD AND COMPUTER FOR DETECTING DECREASE IN TIRE AIR PRESSURE BY CALCULATING A GAIN CORRESPONDING TO AN ARBITRARY FREQUENCY

BACKGROUND OF THE INVENTION

1. Field of the Invention

The present invention relates to an apparatus and a method for detecting a decrease in the air pressure of a tire of a running vehicle based on the resonance frequency of the tire as well as a program for detecting a decrease in a tire air pressure.

2. Description of the Related Art

Factors for enabling the safe running of an automobile include a tire air pressure. If the air pressure value decreases and is lower than an appropriate value, this causes deteriorated operation stability and fuel efficiency to consequently cause a tire burst. To prevent this, a tire air pressure alarming apparatus (Tire Pressure Monitoring System; TPMS), which is to detect the decrease in a tire air pressure to notify a driver of this decrease to prompt the driver to take an appropriate measure, is an important technique from the viewpoints of environment conservation and the secured safety of the driver.

A conventional alarming apparatus can be classified into two types of the direct detecting-type one (direct TPMS) and the indirect detecting-type one (indirect TPMS). The direct TPMS directly measures a tire air pressure by providing a pressure sensor in a tire wheel. The direct TPMS can accurately detect a decrease in a tire air pressure but requires an exclusive wheel and has a poor fault-tolerance performance in an actual environment for example. Thus, the direct TPMS has disadvantages in technique and cost.

On the other hand, the indirect TPMS uses a method to estimate an air pressure based on the rotation information of a tire. The indirect TPMS can be further classified into the dynamic loaded radius (DLR)-type one and the resonance frequency mechanism (RFM)-type one. The DLR method uses a phenomenon according to which a tire having a reduced pressure collapses during running to cause a reduced dynamic loaded radius and this tire is consequently rotated at a speed higher than that of a tire having a normal pressure. The DLR method compares rotation velocities of four tires to thereby detect a pressure decrease. Since the DLR method can provide a relatively-easy computation using only a wheel rotation velocity signal obtained from a wheel speed sensor, the DLR method has been widely researched mainly for the purpose of detecting the puncture of one wheel. However, this DLR method merely makes a relative comparison among wheel rotation velocities and thus cannot sense a case of four tire simultaneous deflation (natural leakage). Furthermore, this DLR method also has a disadvantage in that this method cannot accurately sense a reduced pressure in all vehicle running statuses because a difference in the wheel speed is also caused by running conditions such as a vehicle turning, acceleration and deceleration, or an uneven load.

On the other hand, the RFM method is a method that uses a fact that a frequency characteristic of a wheel speed signal changes depending on a reduced tire pressure to thereby detect a difference between a reduced tire pressure and a normal tire pressure. In contrast with the DLR method, the RFM method is based on an absolute comparison between a certain value and the normal values of the respective wheels retained in advance. Thus, the RFM method can cope with a case of four tire simultaneous deflation and the RFM has collected attention as a better indirect detecting method.

However, the RFM method is disadvantageous in that some running condition causes a strong noise for example and thus an estimated frequency value in a target region is not robust enough with regard to a vehicle speed or a road surface condition for example. The present invention relates to a tire status sensing apparatus based on the RFM method. The following section will describe the basic principle of the RFM method in more detail.

When a vehicle is running, the torsional motion in the front-and-rear direction caused by the force to a tire from the road surface and the front-and-rear motion of the suspension have a coupled resonance. This resonance phenomenon also has an influence on the wheel rotation motion. Thus, a wheel speed signal obtained from a wheel sensor provided in an anti-lock braking system (ABS) also includes the information regarding the resonance phenomenon. The coupled resonance is based on a unique vibration mode caused by the torsional rigidity of a tire. Thus, the excitation status thereof changes depending only on a change in the air pressure constituting the physical characteristic of the tire and rarely depends on a change in the vehicle speed or the road surface. Specifically, when the air pressure decreases, the dynamics of the torsional motion of the tire changes. Thus, when the wheel speed signal is subjected to a frequency analysis for a case where a tire has a reduced pressure, a peak shown by the coupled resonance (resonance peak) appears at a lower frequency-side than in the case where the tire has a normal pressure.

FIG. 3 illustrates the power spectrum obtained by subjecting the respective wheel acceleration signals obtained during a fixed time (which are obtained by calculating time differences among wheel speed signals) to Fast Fourier Transform (FFT) obtained during a fixed time regarding tires attached to a vehicle having a normal air pressure and tires having a pressure reduced by 25% from the normal pressure.

The components in the vicinity of 40 to 50 Hz show the vibration caused when the vibration of the tires in the front-and-rear direction is resonant with the suspension of the vehicle. As can be seen from the components, a change in the internal pressure causes a frequency having a peak value (resonance frequency) to move to the lower-frequency-side. Due to the above-described characteristic, this phenomenon appears independently from the tires, the vehicle type, the running speed, and the road surface condition for example. Thus, this RFM method focuses on this resonance frequency and issues an alarm when it is determined that the resonance frequency is relatively lower than a reference frequency estimated during initialization. In this case, the resonance frequency must be estimated based on a wheel speed signal obtained from ABS. However, an in-vehicle calculator having a limited computational resource has a difficulty in storing required time-series data, thus making it difficult to carry out the FFT frequency analysis. Due to this reason, a conventional method estimates the resonance frequency based on an on-line method as will be described later (See the specification of Japanese Patent No. 3152151, for example).

Since vibration can be described by the 2-order model, a wheel speed signal is subjected to a time-series analysis based on the 2-order autoregressive (AR) model. Specifically, a parameter $\theta=\{a_1, \ldots, a_K\}$ in the model represented by the following formula (1) is estimated by the Kalman filter (iterative least squares technique).

$$y(t) = \sum_{i=1}^{K} a_i y(t-i) + \varepsilon \quad (1)$$

In this formula, y(t) represents a wheel speed at the time t, ε represents white noise, and K represents the model order. Since the frequency corresponding to the pole of the transfer function representing the AR model is estimated as a resonance frequency, the resonance frequency can be accurately obtained if a resonance peak is correctly extracted by the model.

However, the conventional method according to the specification of Japanese Patent No. 3152151 has a disadvantage as described below. For example, when a wheel acceleration signal obtained from a vehicle running at a high speed (e.g., 80 km per hour or more) is subjected to a time-series analysis based on a conventional 2-order model, the vertical vibration of tires increasing in proportion to the speed causes an increase in the gain in the vicinity of 80 to 100 Hz, thus failing to correctly extract a target resonance peak. Specifically, under the circumstance where a wheel acceleration signal given as data includes a large amount of information regarding vibrations other than the torsional vibration, only a desired 2-order model cannot be selectively extracted through the above-described simple time-series model. Consequently, a plurality of factors are described evenly. FIG. 4 illustrates the phenomenon as described above. FIG. 4 shows the result of subjecting wheel acceleration signals obtained in two minutes to a FFT frequency analysis, to a time-series analysis based on a 2-order AR model, and to a time-series analysis based on a 20-order AR model. In FIG. 4, the horizontal axis represents the frequency (Hz) and the vertical axis represents the signal strength (dB). A component considered to be caused by the vertical vibration of tires for example is included in a high-frequency component of 80 Hz or more. Thus, it is understood that the resonance frequency estimated by the time-series analysis based on the 2-order AR model is significantly different from the resonance frequency shown by the FFT frequency analysis. When the estimated value depends on an external factor as described above, a reference frequency obtained by initialization under a certain condition is not universal as a reference value for the determination of the abnormality in a tire (reduction in tire pressure). Thus, this reference frequency cannot be expected to accurately operate under an actual environment in which various running conditions are anticipated.

To prevent this, the present applicant has suggested a method of solving this problem caused by the mismatch between models by increasing the number of orders of a model (Japanese Patent Application No. 2008-129055). Specifically, the difficulty in selectively extracting only a desired 2-order model from various pieces of information included in a wheel speed signal is solved by the use of a model having a higher order.

According to this method, the model can have an improved expression capability. Thus, other factors which cannot be expressed by a low-order model can be all described, thus improving the dependency of an estimated value on an external factor. FIG. 4 shows the result of the time-series analysis based on a 20-order AR model. By the increased order, the same value as that of the resonance frequency shown by the FFT frequency analysis can be obtained.

Although the time-series analysis based on a high-order model can correctly identify a peak position, the high order makes it difficult to calculate the pole of the transfer function. In other words, it is difficult to calculate a frequency having a peak value (resonance frequency). To solve this, the above suggestion uses a dimension reduction method with regard to the result of a high-order estimate to thereby change the model to a 2-order model without damaging the estimate accuracy, thereby calculating the resonance frequency.

However, this method has the following two disadvantages. First, the reduction of the order of a model is performed with regard to a fixed frequency range including a resonance peak. However, when other peaks caused by noise for example are in the vicinity of the resonance peak, these peaks are described as a single 2-order model. This consequently causes a case where an estimated resonance frequency value may not be correctly calculated due to the influence by other peaks. FIG. 5 shows an example where this disadvantage appears. FIG. 5 shows the result of subjecting wheel acceleration signals obtained in two minutes to a FFT frequency analysis, a time-series analysis based on a high-order model, and an analysis of a 2-order model obtained by subjecting the result of a time-series analysis based on a high-order model to dimension reduction to reduce the order. In FIG. 5, the horizontal axis represents a frequency (Hz) and the vertical axis represents a signal strength (dB). In this example, the time-series analysis based on the high-order model shows a resonance peak in the vicinity of 48 Hz and also shows an increase in the vicinity of 41 Hz close to 48 Hz. Thus, when the original model is subjected to dimension reduction to provide a 2-order model, the resonance peak position is slightly displaced due to this increase. Although this displacement is not high as that shown in FIG. 4, this displacement is not desirable from the requirement for realizing a high accuracy for detecting an abnormality. On the other hand, if the gain to an arbitrary frequency can be calculated based on the analysis result by a high-order model, a frequency having the maximum gain in frequencies in the vicinity of a resonance peak can be assumed as a resonance frequency. However, since the calculation of the gain of a discrete signal generally requires a value of a nonlinear function, a direct use of this approach in an in-vehicle environment causes a high cost and thus is not realistic.

Secondly, in order to reduce the dimension in the above-suggested method, the filtering by a bandpass filter allowing a fixed frequency range including a resonance peak to pass therethrough must be performed as a pre-processing in order to minimize the first disadvantage. However, since a different tire type has a different resonance frequency, the range within which the filter can be used changes. When the type of tires attached to a vehicle is known in advance, the filter may be used within a determined range. However, such a circumstance cannot be expected in an actual case. Thus, a processing for dynamically changing the application range of the filter is required by finding the type of tires during initialization for example.

However, such a processing is theoretically difficult and is also burdensome. On the other hand, if such a processing is not provided, the only option is to unnecessarily expand the application range of the bandpass filter, thus further consequently complicating the first disadvantage.

SUMMARY OF THE INVENTION

The present invention has been made in view of the situation as described above. It is an objective to provide an apparatus and a method for detecting a decrease in a tire air pressure by which a resonance frequency estimated based on a high-order model can be obtained to thereby use this resonance frequency to accurately detect a decrease in a tire air pressure, and a program for detecting a decrease in a tire air pressure.

In accordance with a first aspect of the present invention, there is provided an apparatus for detecting a decrease in a tire air pressure (hereinafter simply referred to as "detection apparatus") including:

a rotation velocity information detection means for regularly detecting tire rotation velocity information regarding the respective wheels of a vehicle;

a frequency characteristic estimation means for estimating a frequency characteristic of the rotation velocity information based on the rotation velocity information obtained by the rotation velocity information detection means; and a determination means for determining a decrease in the air pressure of the tire based on the estimated frequency characteristic, wherein:

the frequency characteristic estimation means is configured to extract a resonance peak of the rotation velocity information by calculating a gain corresponding to an arbitrary frequency.

In accordance with a second aspect of the present invention, there is provided a detection apparatus including:

a rotation velocity information detection means for regularly detecting tire rotation velocity information regarding the respective wheels of a vehicle;

a rotation acceleration information computation means for computing tire rotation acceleration information based on the rotation velocity information obtained by the rotation velocity information detection means;

a frequency characteristic estimation means for estimating a frequency characteristic of the rotation acceleration information based on the rotation acceleration information obtained by the rotation acceleration information computation means; and a determination means for determining a decrease in the air pressure of the tire based on the estimated frequency characteristic, wherein;

the frequency characteristic estimation means is configured to extract a resonance peak of the rotation acceleration information by calculating a gain corresponding to an arbitrary frequency.

In the detection apparatus of the present invention, a peak shape itself obtained by an analysis by a high-order model can be extracted by calculating a gain to an arbitrary frequency. If this gain calculation is directly performed, the cost is high. However, the cost can be reduced by retaining a conversion table of parameters based on an inverse transformation of a bilinear transformation for example.

Furthermore, dimension reduction for calculating a resonance frequency is not required and thus a filter processing for dimension reduction is not required and the setting of a filter parameter is also not required.

The determination means can be configured to determine that a tire air pressure is decreased when a difference between a resonance frequency at a normal air pressure stored as a reference frequency in advance and the resonance frequency estimated by the frequency characteristic estimation means is larger than a predetermined threshold value.

In accordance with a third aspect of the present invention, there is provided a method of detecting a decrease in a tire air pressure (hereinafter simply referred to as "detection method") including:

a detection step of regularly detecting tire rotation velocity information regarding the respective wheels of a vehicle;

an estimation step of estimating a frequency characteristic of the rotation velocity information based on the rotation velocity information obtained by the detection step; and a determination step of determining a decrease in the air pressure of the tire based on the estimated frequency characteristic, wherein:

the estimation step is configured to extract a resonance peak of the rotation velocity information by calculating a gain corresponding to an arbitrary frequency.

In accordance with a fourth aspect of the present invention, there is provided a detection method including:

a detection step of regularly detecting tire rotation velocity information regarding the respective wheels of a vehicle;

a computation step of computing tire rotation acceleration information based on the rotation velocity information obtained in the detection step;

an estimation step of estimating a frequency characteristic of the rotation acceleration information based on the rotation acceleration information obtained in the computation step; and a determination step of determining a decrease in the air pressure of the tire based on the estimated frequency characteristic, wherein:

the estimation step is configured to extract a resonance peak of the rotation acceleration information by calculating a gain corresponding to an arbitrary frequency.

In the detection method of the present invention, a peak shape itself obtained by an analysis by a high-order model can be extracted by calculating a gain to an arbitrary frequency. If this gain calculation is directly performed, the cost is high. However, the cost can be reduced by retaining a conversion table of parameters based on an inverse transformation of a bilinear transformation for example.

The determination step can determine that a tire air pressure is decreased when a difference between a resonance frequency at a normal air pressure stored as a reference frequency in advance and the resonance frequency estimated in the frequency characteristic estimation step is larger than a predetermined threshold value.

In accordance with a fifth aspect of the present invention, there is provided a program for causing, in order to detect a decrease in a tire air pressure of the tire based on a resonance frequency of tires of a running vehicle, a computer to function as:

a frequency characteristic estimation means for estimating, based on rotation velocity information obtained by a rotation velocity information detection means for regularly detecting tire rotation velocity information regarding the respective wheels of a vehicle, a frequency characteristic of the rotation velocity information; and a determination means for determining a decrease in the air pressure of the tire based on the estimated frequency characteristic, wherein:

the frequency characteristic estimation means is configured to extract a resonance peak of the rotation velocity information by calculating a gain corresponding to an arbitrary frequency.

In accordance with a sixth aspect of the present invention, there is provided a program for causing, in order to detect a decrease in a tire air pressure of the tire based on a resonance frequency of tires of a running vehicle, a computer to function as:

a rotation acceleration information computation means for computing tire rotation acceleration information based on rotation velocity information obtained by a rotation velocity information detection means for regularly detecting tire rotation velocity information regarding the respective wheels of a vehicle;

a frequency characteristic estimation means for estimating a frequency characteristic of the rotation acceleration information based on the rotation acceleration information computed by the rotation acceleration information computation means; and a determination means for determining a decrease in the air pressure of the tire based on the estimated frequency characteristic, wherein:

the frequency characteristic estimation means is configured to extract a resonance peak of the rotation acceleration information by calculating a gain corresponding to an arbitrary frequency.

DETAILED DESCRIPTION

The following section will describe in detail, with reference to the attached drawings, an embodiment of an apparatus and a method for detecting a decrease in a tire air pressure and a program for detecting a decrease in a tire air pressure of the present invention.

Figure 1:
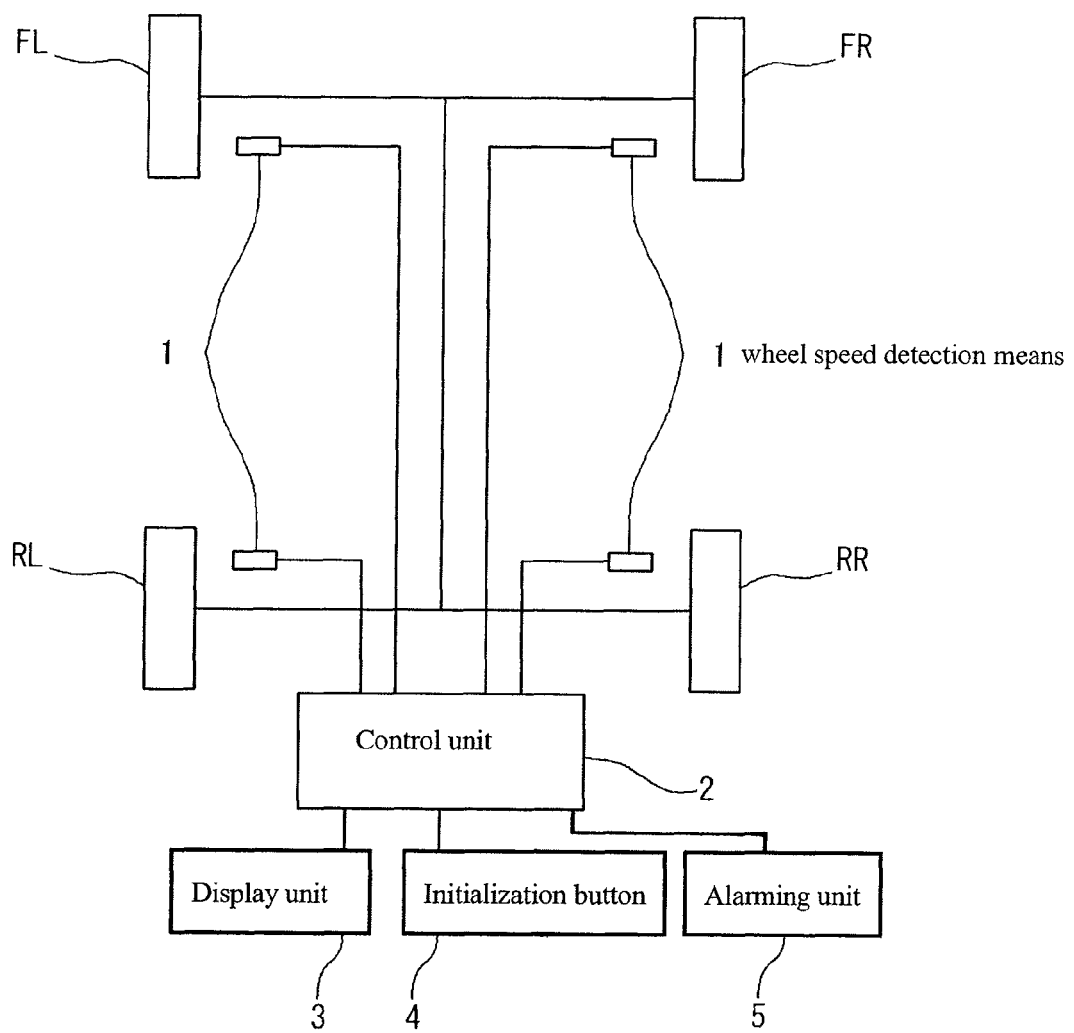
FIG. 1 is a block diagram illustrating one embodiment of a detection apparatus of the present invention.

As shown in FIG. 1, the detection apparatus according to one embodiment of the present invention includes, in order to detect rotation velocity information regarding four tires provided in a four-wheel vehicle (left front wheel (FL), right front wheel (FR), left rear wheel (RL), and right rear wheel (RR)), a normal wheel speed detection means (rotation velocity information detection means) 1 provided in association with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as the one that generates power using rotation as in a dynamo to measure an angular velocity and a wheel speed based on this voltage. The output from the wheel speed detection means 1 is given to a control unit 2 that is a computer such as ABS. This control unit 2 is connected to a display unit 3 composed of a liquid crystal display element, a plasma display element or CRT for example for displaying a tire having a decreased pressure, an initialization button 4 that can be operated by a driver, and an alarming unit 5 for notifying a driver of a tire having a decreased pressure.

Figure 2:
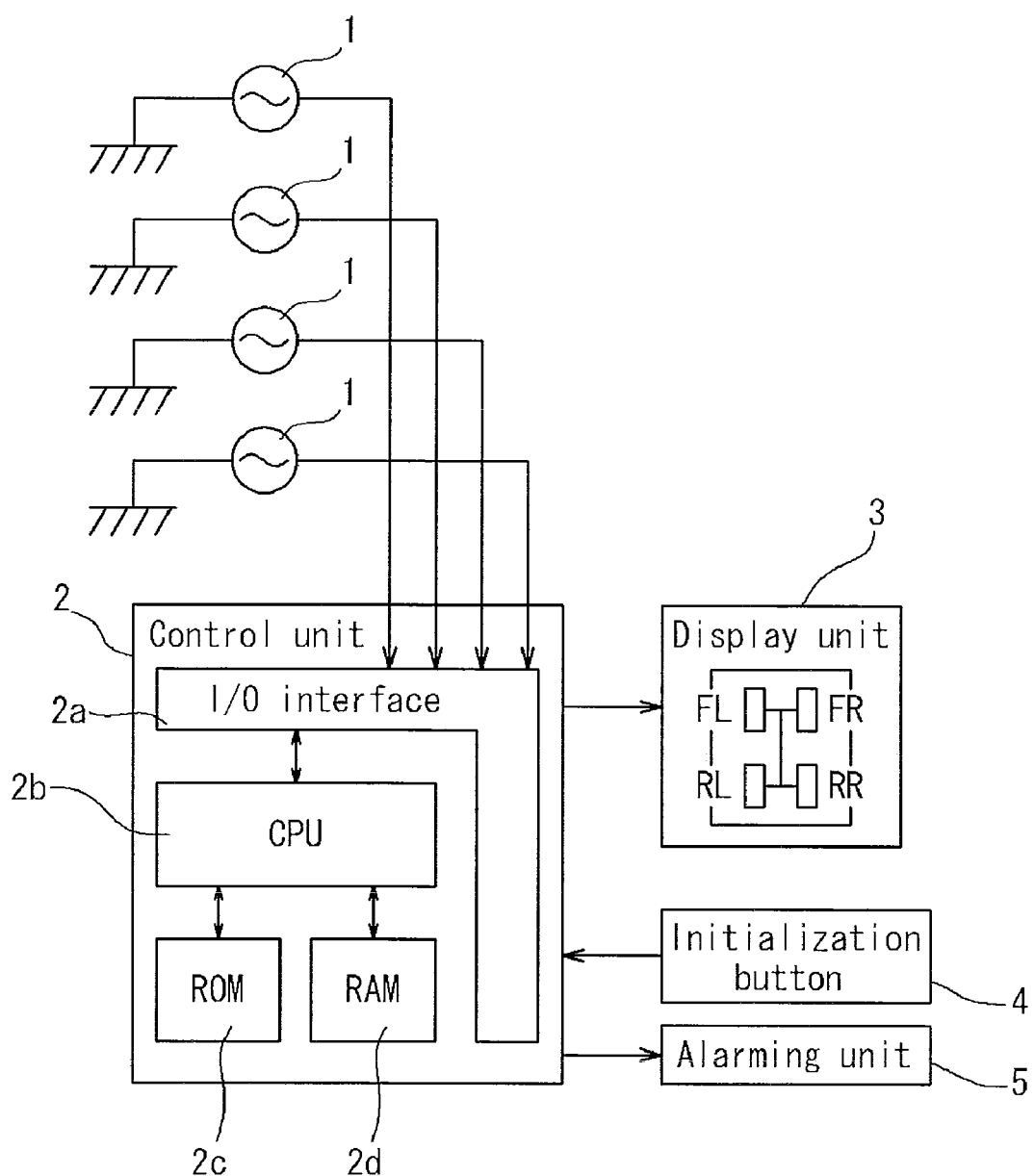
FIG. 2 is a block diagram illustrating an electrical configuration of the detection apparatus shown in FIG. 1.
Figure 3:
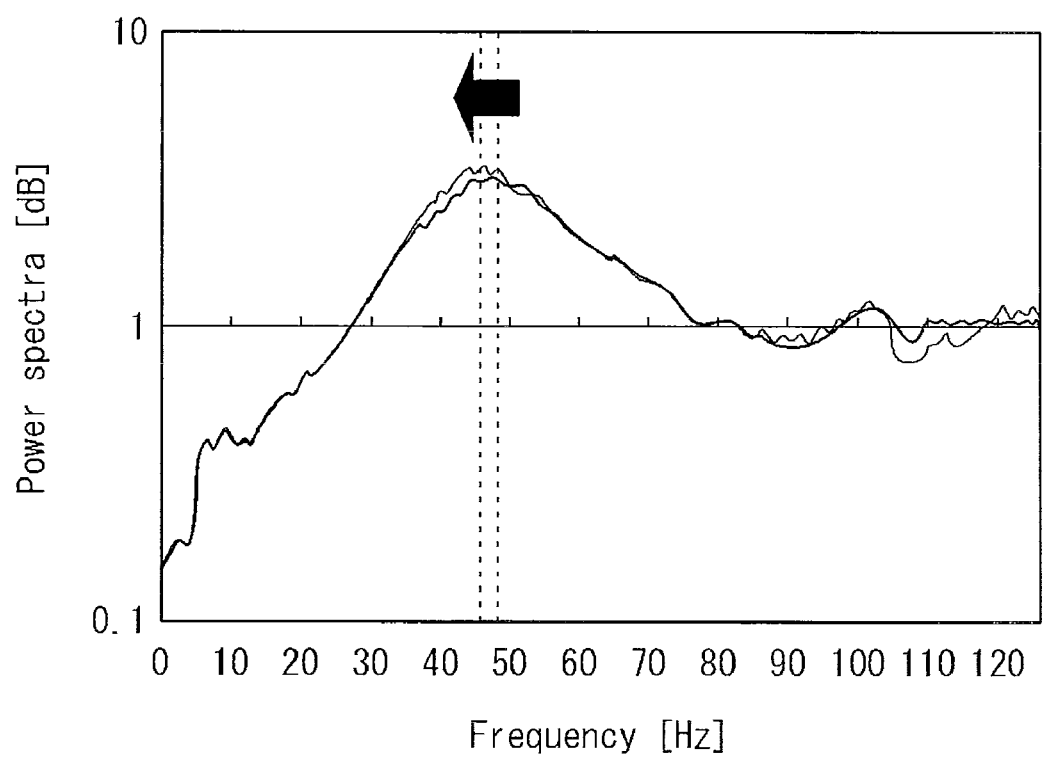
FIG. 3 illustrates the power spectrum obtained by applying FFT to wheel acceleration signals obtained in two minutes.
Figure 4:
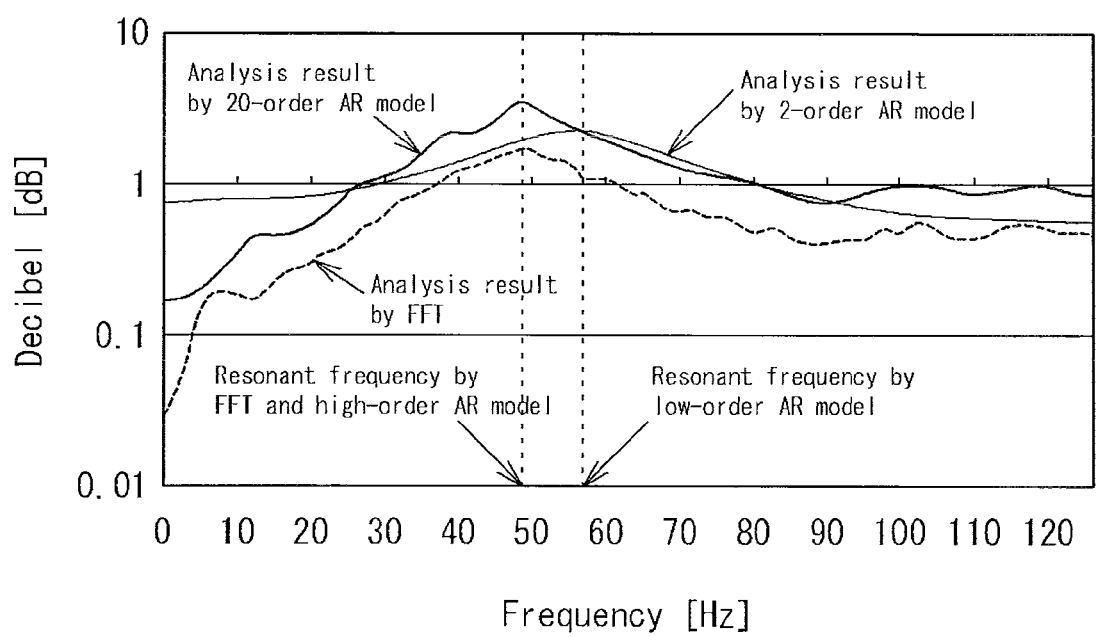
FIG. 4 shows the result obtained by subjecting wheel acceleration signals obtained in two minutes to a FFT frequency analysis, to a time-series analysis based on a 2-order AR model, and to a time-series analysis based on a 20-order AR model.

As shown in FIG. 2, the control unit 2 is composed of: an I/O interface $2a$ required for the exchange of a signal with an external apparatus; a CPU $2b$ functioning as a computation processing center; a ROM $2c$ storing therein a control operation program of this CPU $2b$; and a RAM $2d$ to which data is temporarily written when the CPU $2b$ performs a control operation or from which the written data is read out.

The wheel speed detection means 1 outputs a pulse signal corresponding to the rotation number of a tire (hereinafter also referred to as "wheel speed pulse"). Then, by sampling this wheel speed pulse at a predetermined sampling cycle $\Delta T$ (second) (e.g., $\Delta T=0.005$ second), the time-series data for the wheel speed signal can be obtained. Since the resonance frequency of a target tire in the torsional direction appears in a range in the vicinity of several tens of Hz, the sampling cycle must be equal to or higher than several tens of Hz.

The detection apparatus according to this embodiment is mainly composed of: the wheel speed detection means (rotation velocity information detection means) 1, a frequency characteristic estimation means for estimating a frequency characteristic of the rotation velocity information based on the rotation velocity information obtained by the wheel velocity detection means; and a determination means for determining a decrease in the air pressure of the tire based on the estimated frequency characteristic. A program for detecting a decrease in a tire air pressure causes the control unit 2 to function as the frequency characteristic estimation means and the determination means. The frequency characteristic estimation means is configured to calculate the gain corresponding to an arbitrary frequency to thereby extract a resonance peak of the rotation velocity information.

Next, the operation of the detection apparatus of this embodiment will be described sequentially.

(1) First, the wheel speed detection means detects a wheel rotation signal.

(2) Next, the wheel rotation signal is sampled based on a predetermined sampling cycle to thereby obtain the time-series data regarding the wheel speed signal. The sampling cycle can be selected from cycles in a range from 1 to 8 ms for example.

(3) Next, the time difference among the resultant wheel speed signals is calculated and is assumed as a wheel acceleration signal. The wheel speed data also can be subjected to a time-series analysis as time-series data. However, the wheel acceleration data has a smaller change than that of the wheel speed data. Thus, the use of the wheel acceleration data is desired from the viewpoint of improving the computation accuracy.

(4) Next, the computed wheel rotation acceleration data is subjected as time-series data to a time-series analysis.

The present invention is characterized in that an inverse transformation based on a bilinear transformation is performed in this time-series analysis to thereby simplify the calculation of the gain corresponding to an arbitrary frequency. A calculation after the inverse transformation requires a load that is light enough to be handled by an in-vehicle calculator within an actual time. Thus, an existing in-vehicle device can calculate the gain corresponding to an arbitrary frequency of a high-order model. Accordingly, the surrounding waveform including a peak can be accurately obtained, thereby solving the above-described two disadvantages.

The transfer function to the discrete time z of a K-order AR model is as shown below.

$$G(z; \hat{\theta}) = \frac{1}{z^K + \hat{\alpha}_1 z^{K-1} + \ldots + \hat{\alpha}_{K-1} z + \hat{\alpha}_K}$$

In this formula, $\hat{\theta} = \{\hat{\alpha}_1, \ldots, \hat{\alpha}_K\}$ is established.

In order to obtain the gain of the transfer function to the frequency f, the following formula (2) is calculated based on the following assumption.

$$z| \to e^{j \cdot 2\pi fm}$$

$$G(j\omega)| = -20 \log_{10}\sqrt{A^2 + B^2} \qquad (2)$$

In the formula, j represents an imaginary unit, ω represents an angular frequency, m represents a sampling cycle, and A and B represent a real part and an imaginary part in the formula, respectively. This calculation requires a development to a trigonometric function using the Euler's formula. Such a complicated processing cannot be performed by an in-vehicle calculator having a limited calculation capability. On the other hand, if the in-vehicle calculator is substituted with another calculator that can handle this calculation in order to carry out this calculation, a high cost is required and thus this is not realistic.

In the present invention, the discrete approximation called a bilinear transformation is used to subject, to an inverse transformation, a transfer function to the discrete time obtained from a transfer function to a continuous time to obtain the transfer function to the continuous time.

Specifically, the transfer function to the continuous time s is obtained as shown in the following formula.

$$G(s; \theta) = \frac{\beta_0 s^K + \beta_1 s^{K-1} + \ldots + \beta_{K-1} s + \beta_K}{s^K + \alpha_1 s^{K-1} + \ldots + \alpha_{K-1} s + \alpha_K} \qquad (3)$$

Then, when this formula is subjected to an inverse transformation, the respective parameters θ of the formula $(3) = \{\alpha_1, \ldots, \alpha_K, \beta_1, \ldots, \beta_K\}$ are obtained in the following formula.

$$a_i = m^i \sum_{i=1}^{K} \hat{\alpha}_k \sum_{\substack{j-1=i \\ 0 \leq j \leq k \\ 0 \leq j \leq K-k}} \binom{k}{j}(-1)^j(-2)^{k-j}\binom{K-k}{1} 1^1 (-2)^{K-k-1} \qquad (4)$$

$$\beta_i = m^i \binom{K}{i} 1^i (-2)^{K-i}$$

Since the parameters $\hat{\theta} = \{\hat{\alpha}_1, \ldots, \hat{\alpha}_K\}$ of the transfer function to the discrete time are calculated by the Kalman filter (iterative least squares technique), the transformation is used to calculate $\alpha = (\alpha_1, \ldots, \alpha_K)$ of the parameters of the transfer function to the continuous time. $(\beta_1, \ldots, \beta_K)$ is uniquely determined regardless of parameters $\hat{\theta}$.

The gain to the frequency f is established as follows.

$$s| \to j \cdot 2 \cdot fm$$

Thus, the formula (2) may be calculated and a value of a nonlinear function (trigonometric function) is not needed as in a direct calculation. In an actual case, in order to perform the conversion, a part of the formula (4) is used as a conversion table and is retained in advance in accordance with the order. Specifically, if the following formula is retained as a matrix, $$X = \sum_{\substack{j+1=i \\ 0 \leq j \leq k \\ 0 \leq j \leq K-k}} \binom{k}{j}(-1)^j(-2)^{k-j}\binom{K-k}{1} 1^1 (-2)^{K-k-1}$$

$\alpha = X\hat{\alpha}$ a can be used in the calculation. In this formula, $\hat{\alpha} = (m\hat{\alpha}_1, \ldots, m^K \hat{\alpha}_K)'$.

The calculation amount of this calculation linearly increases in accordance with the order. However, considering the fact that the order is 20 at the maximum, this calculation requires not so much load on an in-vehicle calculator having a limited calculation capability. However, since the transformation causes a frequency distortion, a correction processing such as prewarping must be performed.

In the present invention, the following processing is performed in order to obtain a peak shape in the vicinity of the resonance peak.

First, a frequency range securely covering the resonance peak of any type of tire is set. Then, during the initialization of the detection apparatus, the gains corresponding to the respective frequencies within this range are calculated by the detection method of the present invention. Thereafter, a frequency having the maximum value within this range is acquired. An average value of these frequencies obtained in a predetermined calculation step is stored as a resonance frequency as a reference for determining abnormality (reference frequency). After the completion of the initialization, the upper and lower several Hz of the reference frequencies can be assumed as a target range for which the gain is calculated, thereby obtaining the peak shape.

EXAMPLE

Next, an example of the detection method of the present invention will be described. However, the present invention is not limited only to the following example.

Runflat tires (size: 245/40R18) were attached to a four-wheel-drive vehicle of 2800 cc displacement. Then, the vehicle was made to run and the rotation information regarding the respective tire wheels was sampled at every 4 ms to obtain the time-series data for the wheel speed signal. Then, a time difference among the resultant wheel speed signals was calculated to thereby obtain a wheel acceleration signal.

Figure 5:
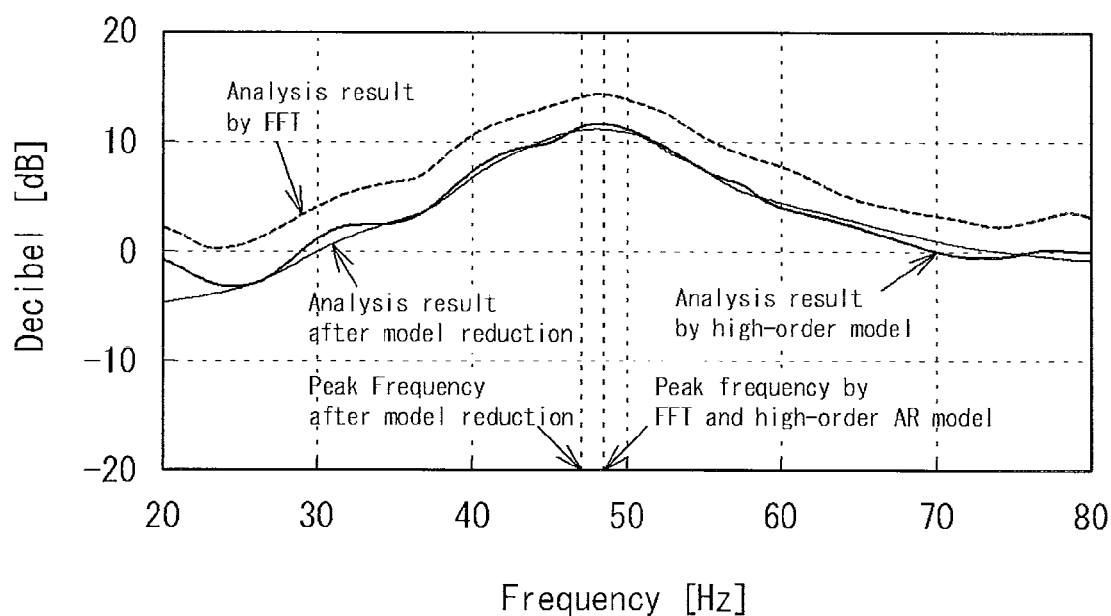
FIG. 5 shows the result obtained by subjecting wheel acceleration signals obtained in two minutes to a FFT frequency analysis, to a time-series analysis based on a high-order model, and to an analysis of a 2-order model obtained by subjecting the result of the time-series analysis based on a high-order model to dimension reduction.

With regard to the actual data causing the same circumstance as in FIG. 5, the conventional method and the method based on the present invention were applied, respectively to compare the estimated resonance frequency values, the result of which is shown in the following table.

TABLE 1

| | |
|---|---|
| Resonance frequency estimated based on time-series analysis based on high-order model | 48.4 Hz |
| Resonance frequency estimated by dimension reduction (to 2-order) (conventional method) | 47.1 Hz |
| Resonance frequency estimated by the present invention based on time-series analysis result based on high-order model (Example) | 48.4 Hz |

In the case of the conventional method, when other peaks caused by noise for example are in the vicinity of the resonance peak for example as described above, in a process of dimension reduction of a high-order model, the estimated resonance frequency value is dislocated from a desired value (from 48.4 Hz to 47.1 Hz). In contrast with this, the present invention can use the above-described calculation method to directly calculate the gain corresponding to an arbitrary frequency. Thus, this problem can be solved. (The estimated value in the case of the invention is 48.4 Hz and shows no change).

What is claimed is:

1. An apparatus for detecting a decrease in a tire air pressure, comprising:
   a rotation velocity information detection device configured to regularly detect tire rotation velocity information regarding the respective wheels of a vehicle;
   a frequency characteristic estimation device configured to estimate a frequency characteristic of the rotation velocity information based on the rotation velocity information obtained by the rotation velocity information detection means; and
   a determination device configured to determine a decrease in the air pressure of the tire based on the estimated frequency characteristic,
   wherein the frequency characteristic estimation device is configured to extract a resonance peak of the rotation velocity information by calculating a gain corresponding to an arbitrary frequency, and
   wherein the apparatus is adapted to calculate the gain corresponding to an arbitrary frequency by using an inverse transformation based on a bilinear transformation.

2. An apparatus for detecting a decrease in a tire air pressure, comprising:
   a rotation velocity information detection device configured to regularly detect tire rotation velocity information regarding the respective wheels of a vehicle;
   a rotation acceleration information computation device configured to compute tire rotation acceleration information based on the rotation velocity information obtained by the rotation velocity information detection means;
   a frequency characteristic estimation device configured to estimate a frequency characteristic of the rotation acceleration information based on the rotation acceleration information obtained by the rotation acceleration information computation means; and
   a determination device configured to determine a decrease in the air pressure of the tire based on the estimated frequency characteristic,
   wherein the frequency characteristic estimation device is configured to extract a resonance peak of the rotation acceleration information by calculating a gain corresponding to an arbitrary frequency, and
   wherein the apparatus is adapted to calculate the gain corresponding to an arbitrary frequency by using an inverse transformation based on a bilinear transformation.

3. The apparatus for detecting a decrease in a tire air pressure according to claim 1, wherein:
   the determination device is configured to determine that a tire air pressure is decreased when a difference between a resonance frequency at a normal air pressure stored as a reference frequency in advance and the resonance frequency estimated by the frequency characteristic estimation device is larger than a predetermined threshold value.

4. A method of detecting a decrease in a tire air pressure, comprising:
   a detection step of regularly detecting tire rotation velocity information regarding the respective wheels of a vehicle;
   an estimation step of estimating a frequency characteristic of the rotation velocity information based on the rotation velocity information obtained in the detection step; and
   a determination step of determining a decrease in the air pressure of the tire based on the estimated frequency characteristic,
   wherein the estimation step is configured to extract a resonance peak of the rotation velocity information by calculating a gain corresponding to an arbitrary frequency, and
   wherein in the estimation step, the gain corresponding to an arbitrary frequency is calculated by using an inverse transformation based on a bilinear transformation.

5. A method of detecting a decrease in a tire air pressure, comprising:
   a detection step of regularly detecting tire rotation velocity information regarding the respective wheels of a vehicle;
   a computation step of computing tire rotation acceleration information based on the rotation velocity information obtained in the detection step;
   an estimation step of estimating a frequency characteristic of the rotation acceleration information based on the rotation acceleration information obtained in the computation step; and
   a determination step of determining a decrease in the air pressure of the tire based on the estimated frequency characteristic,
   wherein the estimation step is configured to extract a resonance peak of the rotation acceleration information by calculating a gain corresponding to an arbitrary frequency, and
   wherein in the estimation step, the gain corresponding to an arbitrary frequency is calculated by using an inverse transformation based on a bilinear transformation.

6. The method of detecting a decrease in a tire air pressure according to claim 4,
   wherein the determination step determines that a tire air pressure is decreased when a difference between a resonance frequency at a normal air pressure stored as a reference frequency in advance and the resonance frequency estimated in the frequency characteristic estimation step is larger than a predetermined threshold value.

7. A program for causing, in order to detect a decrease in an air pressure of the tire based on a resonance frequency of tires of a running vehicle, a computer containing said program to function as:
   a frequency characteristic estimation device configured to estimate, based on rotation velocity information obtained by a rotation velocity information detection means for regularly detecting tire rotation velocity information regarding the respective wheels of a vehicle, a frequency characteristic of the rotation velocity information; and
   a determination device configured to determine a decrease in the air pressure of the tire based on the estimated frequency characteristic,
   wherein the frequency characteristic estimation device is configured to extract a resonance peak of the rotation velocity information by calculating a gain corresponding to an arbitrary frequency, and
   wherein the frequency characteristic estimation device is adapted to calculate the gain corresponding to the arbitrary frequency by using an inverse transformation based on a bilinear transformation.

8. A program for causing, in order to detect a decrease in an air pressure of the tire based on a resonance frequency of tires of a running vehicle, a computer containing said program to function as:

a rotation acceleration information computation device configured to compute tire rotation acceleration information based on rotation velocity information obtained by a rotation velocity information detection means for regularly detecting tire rotation velocity information regarding the respective wheels of a vehicle;

a frequency characteristic estimation device configured to estimate a frequency characteristic of the rotation acceleration information based on the rotation acceleration information computed by the rotation acceleration information computation means; and a determination device configured to determine a decrease in the air pressure of the tire based on the estimated frequency characteristic, wherein the frequency characteristic estimation device is configured to extract a resonance peak of the rotation acceleration information by calculating a gain corresponding to an arbitrary frequency, and wherein the frequency characteristic estimation device is adapted to calculate the gain corresponding to the arbitrary frequency by using an inverse transformation based on a bilinear transformation.

* * * * *